May 15, 1956  W. R. COLLINGS ET AL  2,745,233
SEMIAUTOMATIC BOOK-FORMING MACHINE AND METHOD
Filed March 10, 1951  9 Sheets-Sheet 1

INVENTORS
William R. Collings
Harold L. Browne and
Arthur A. Weirauch.
BY William C. Blackburn
ATTORNEY May 15, 1956   W. R. COLLINGS ET AL   2,745,233
SEMIAUTOMATIC BOOK-FORMING MACHINE AND METHOD
Filed March 10, 1951   9 Sheets-Sheet 2

INVENTORS.
William R. Collings
Harold L. Browne and
Arthur A. Weirauch.
BY William C. Blackburn
ATTORNEY May 15, 1956   W. R. COLLINGS ET AL   2,745,233
SEMIAUTOMATIC BOOK-FORMING MACHINE AND METHOD
Filed March 10, 1951   9 Sheets-Sheet 3

INVENTORS.
William R. Collings
Harold L. Browne and
Arthur A. Weirauch.
BY
William C. Blackburn
ATTORNEY.

May 15, 1956   W. R. COLLINGS ET AL   2,745,233
SEMIAUTOMATIC BOOK-FORMING MACHINE AND METHOD
Filed March 10, 1951                                   9 Sheets-Sheet 8

INVENTORS.
William R. Collings
Harold L. Browne and
Arthur A. Weirauch.
BY William C. Blackburn
ATTORNEY May 15, 1956 W. R. COLLINGS ET AL 2,745,233
SEMIAUTOMATIC BOOK-FORMING MACHINE AND METHOD
Filed March 10, 1951 9 Sheets-Sheet 9

INVENTORS.
William R. Collings,
Harold L. Browne and
Arthur A. Weirauch.
BY William C. Blackburn
ATTORNEY United States Patent Office 2,745,233
Patented May 15, 1956

2,745,233

SEMIAUTOMATIC BOOK-FORMING MACHINE AND METHOD

William R. Collings, Harold L. Browne, and Arthur A. Weirauch, Midland, Mich., assignors to Dow Corning Corporation, Midland, Mich., a corporation of Michigan Application March 10, 1951, Serial No. 214,976

5 Claims. (Cl. 53—139)

This invention relates to a method of forming books of tissues such as are used for cleaning and polishing eyeglasses, and to a semi-automatic machine for carrying out the method.

The invention provides a machine and method in which the tissue in continuous rolls is passed through a unit which treats it with the cleaning and polishing fluid, and slits and perforates it in the required widths. The ribbons of perforated tissue are wound up in layers and then cut to form pads of treated tissues ready for insertion in covers. Simultaneously the cover stock (a plastic) in continuous rolls passes through a unit which cuts the stock to required length and heat forms it into preliminary shape. A treated and perforated pad of tissues, together with a stiffening strip and any desired advertising matter has in the meanwhile been trimmed to required length, and is now folded and assembled by hand inside the preliminarily-formed cover stock to form a sub-assembly.

This sub-assembly is then fed into a final unit which forms the sub-assembly into permanent flattened shape under heat and pressure, and which also inserts the staples and slits the sub-assembly into separate books.

A particular feature of the method resides in the fact that the stapling and slitting operations are carried out while the sub-assembly is continuously held under heat and pressure.

Another feature of the method resides in the fact that the cover stock is treated with an aqueous emulsion which prevents electrostatic effects during the process and gives the cover a permanent bright, shiny surface.

*Unit No. 1 (tissue-treating)*

The tissue-treating unit is shown in Figs. 1 to 8 inclusive. The general operation of this unit is best understood by referring ot Fig. 1, which is a schematic side elevation of this unit. The tissue, indicated generally by the letter B, is drawn from the supply roll, indicated at A, and passes first through the treating rolls C, where it is treated with the desired fluid; then through the draw rolls D, which draw it from the supply roll; then through the slitting and perforating rolls E, which slit it into suitable strips and perforate each strip near one edge; and finally to the wind-up mandrel F.

Referring to Figs. 1 to 8 in greater detail, the main frame 10 is built up from angle iron in the general shape indicated. The shaft 11, which carries the supply roll 12, is received in C-shaped openings 13 in the mounting brackets 14, and is held in place by pins 15. A friction brake 16 operates on drum 17 fixed to shaft 11 to apply a slight retarding force and prevent over-running of the supply roll. The rolls of tissue paper 12 may range in width from about 39 in. to 41 in. In order to adjust the roll 12 laterally to align the paper with the other rolls of the machine, a handwheel 17a is connected to the roll by suitable gearing.

Figure 1:
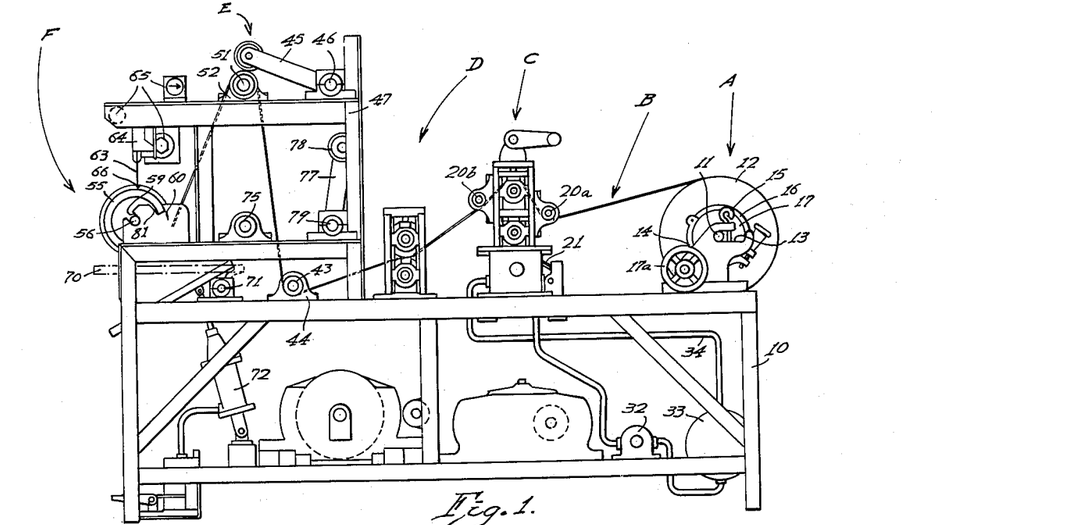
Fig. 1 is a schematic side elevation of the tissue-treating unit, the driving gears and other operating parts being omitted in order to clearly show the path of the tissue through the machine.

After leaving the supply roll 12 the tissue passes through the treating rolls, indicated generally at C in Fig. 1. These treating rolls, shown in greater detail in Figs. 4 and 5, include a dip roll 18, a rubber transfer roll 19, a steel transfer roll 20, an idler roll 20a, and an idler roll 20b.

Figure 4:
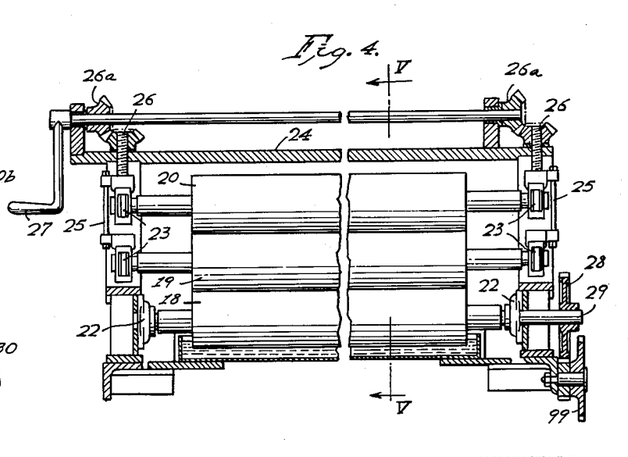
Fig. 4 is a detailed section, partly in elevation, of the treating rolls C, of Fig. 1.
Figure 5:
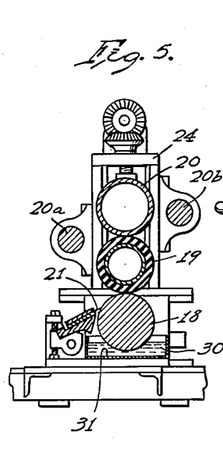
Fig. 5 is a section, partly in elevation, taken on line V—V of Fig. 4.

The steel dip roll has its surface cut with very fine circumferential threads, 32 to the inch, and is preferably chrome-plated. This roll dips into the treating fluid and carries it up to the rubber transfer roll. A doctor blade 21 engages the surface of the dip roll to remove surplus fluid. The doctor blade is preferably formed of flexible steel, such as shim stock .010 in. thick. Due to the presence of the fine grooves of the screw threads, this dip roll carries a constant amount of fluid to the rubber transfer roll.

The transfer roll 19 is covered with some material, such as synthetic rubber, that will readily transfer the treating fluid from the dip roll 18 to the steel transfer roll 20, without being affected by the fluid.

The steel transfer roll 20, which is at the top of this stand of rolls, receives the fluid from the rubber transfer roll and applies it to the sheet of tissue.

The dip roll 18 is mounted in bearings 22, and each of the rolls 19 and 20 rotates on bearings 23, which are slidable vertically in the sub-frame 24. Yokes 25 are movable vertically by means of threaded rods 26, gears 26a and hand lever 27 to move the bearings 23 upwardly. During operation of the machine the rubber transfer roll 19 and the steel transfer roll 20 are pulled down toward the dip roll 18 by gravity only. When the machine is to stand idle the handle 27 is operated to relieve the pressure of these rolls. The first movement lifts the steel transfer roll 20 to a position out of contact with the rubber transfer roll 19, and subsequent movement lifts both the rolls 19 and 20, so that in the inactive position neither of the steel rolls is in contact with the rubber roll, thus preventing any flattening of the rubber roll.

The treating rolls are rotated through a gear 28 mounted on the shaft 29 of the dip roll.

The treating fluid is preferably dimethylpolysiloxane, 200 to 500 centistokes (cs.) viscosity, such as is disclosed in U. S. Patent No. 2,384,384. This fluid is maintained at the level marked 30 in the pan 31 by means of a pump 32 (Fig. 1) which pumps the fluid from supply tank 33. A gravity overflow line 34 carries any surplus back to the tank.

Figure 6:
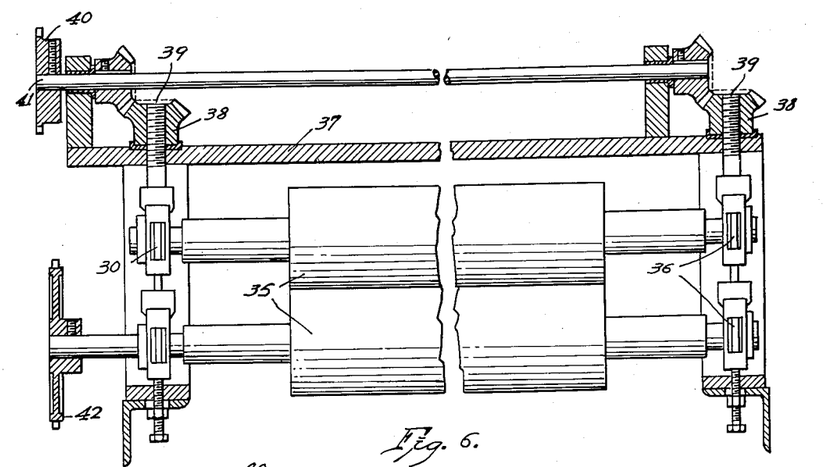
Fig. 6 is a section, partly in elevation, of the draw rolls D of Fig. 1.
Figure 7:
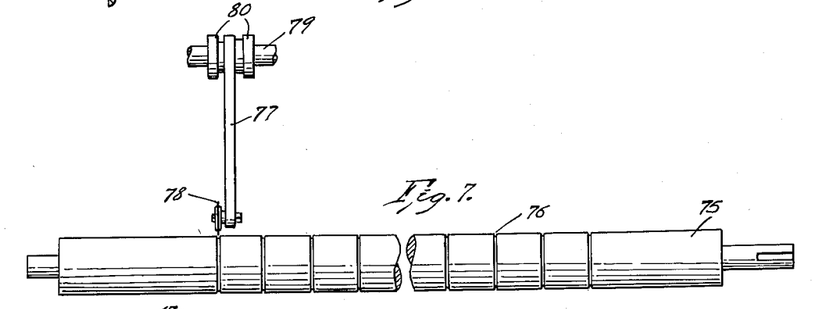
Fig. 7 is a fragmentary plan view of the slitting rolls of Fig. 1.

From the treating rolls C (Fig. 1) the tissue passes to the draw rolls D, which draw it from the supply roll A. These draw rolls, indicated at 35 in Fig. 6, are covered with some material such as synthetic rubber which will grip the tissue without injuring it.

The draw rolls 35 are carried by bearings 36 which are vertically slidable in the sub-frame 37. The bearings for the upper draw roll can be adjusted vertically by gears 38 operating on threaded stems 39 attached to the bearings. A sprocket wheel 40 turns shaft 41 to operate the gears 38. By moving the sprocket wheel 40 it is possible to vary the pressure between the draw rolls. The lower draw roll is driven by a gear 42 mounted on the shaft which carries the lower roll.

From the draw rolls D (Fig. 1) the tissue passes under an idler roll 43 mounted in pillow blocks 44 carried on the main frame, and then to the slitting and perforating rolls E.

Figure 2:
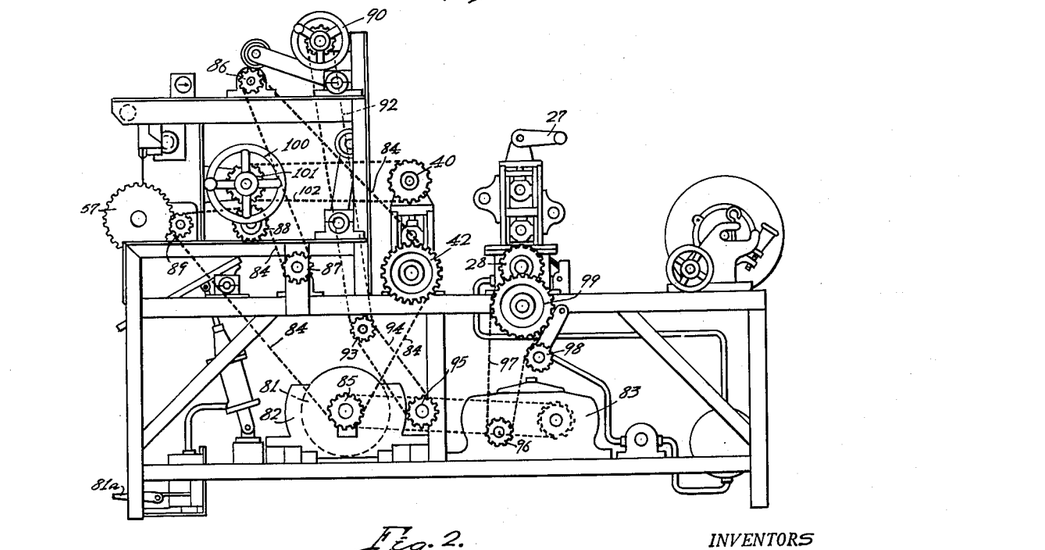
Fig. 2 is a view similar to Fig. 1 but with the driving parts, such as gears and sprocket chains, added.

The slitting and perforating mechanism includes a plurality of arms 45 (Figs. 1 and 2). The number of these arms depends upon the width of the sheet of tissue. In the machine illustrated eight of these arms are provided. Each arm 45 is independently pivoted on shaft 46 mounted on sub-frame 47, and is held in proper spaced relation by collars 47a. As shown in detail in Fig. 8 each of the arms 45 carries at its outer end a slitter wheel 48 and perforator wheel 49, both of these wheels being clamped to a support wheel 50 mounted on ball bearings.

Figure 8:
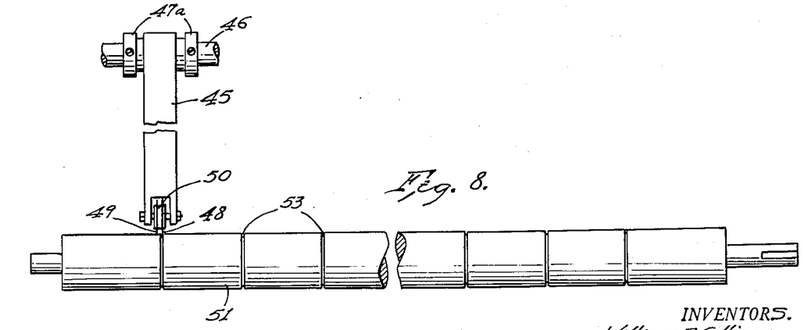
Fig. 8 is a fragmentary plan view of the slitting and perforating rolls E of Fig. 1.

A back-up roll 51, which co-operates with arms 45, is mounted for free rotation in pillow blocks 52 carried by the sub-frame 47. The back-up roll is formed of steel and has a circumferential groove 53 for each of the slitter wheels 48. These grooves permit the slitter wheels to cut completely through the sheet of tissue, severing the sheet into individual strips of tissue. The perforator wheels cut against the solid surface of the back-up roll to impress a line of perforations along one edge of each of the individual strips of tissue. A gear 54 is mounted on the shaft of the back-up roll 51 for driving purposes.

In a preferred form of the invention the strips of tissue are cut 4¾ in. wide, and have the line of perforations ⅜ in. from one edge.

In connection with the slitting and perforating wheels 48 and 49, it should be noted that these wheels are not power driven. As viewed in Fig. 8 the slitting wheels are beveled on their right-hand sides and contact the left-hand side wall of grooves 53. This provides the driving force for the slitters, whereby tearing and distortion of the tissue are prevented.

Figure 3:
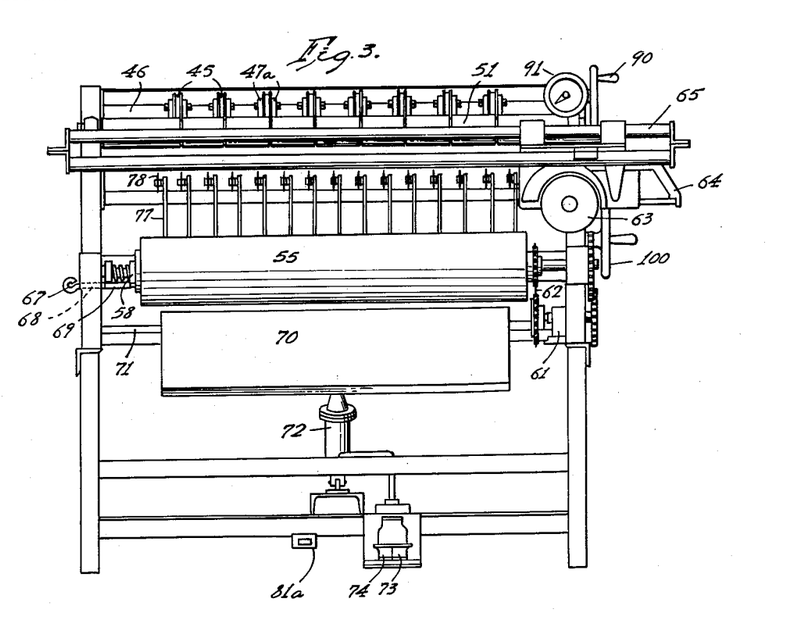
Fig. 3 is a schematic elevation looking at the left-hand end of the unit of Fig. 1.

From the slitting and perforating rolls E the tissue passes to the wind-up mandrel F (Fig. 1), which is indicated in detail at 55 in Figs. 1 and 3.

The wind-up mandrel 55 is a built-up hollow steel drum 42 in. wide having an outer diameter of 7½ in. It is rotatably mounted on shaft 56, which is driven through gear 57. Driving force is transmitted from shaft 56 to mandrel 55 through a friction clutch 58 (Fig. 3). The shaft 56 is readily insertable in babbitted notches 59 in the bearing blocks 60.

To facilitate counting the number of revolutions taken by the wind-up mandrel 55 a suitable timer 61 driven by sprocket chain 62 from the mandrel, gives an audible or other signal.

After the desired number of layers of treated tissue has been wound upon the wind-up mandrel, they are cut through longitudinally of the mandrel by a rotating cutter blade 63 mounted on the electric saw mechanism 64. The saw mechanism is slidably mounted on support rods 65 and is manually pushed across in cutting the layers of tissue. A longitudinal groove 66 in the mandrel permits the cutter blade to sever all layers of tissue without contacting the metal mandrel.

In order to line up the groove 66 with the cutter blade 63, the mandrel is rotated by hand to the correct position, and then the locating pin 67 is inserted through a bore 68 in the left-hand bearing block and the bracket 69, into a socket in the mandrel.

To support the layers of tissue after they have been cut from the wind-up mandrel 55, a work table 70 is pivotally mounted on shaft 71. This work table is normally in its lowered position, shown in Fig. 3 and in the solid lines of Fig. 1. An air cylinder 72, actuated by pedals 73 and 74, moves the table from its lower position to its upper position, shown in dot-dash lines in Fig. 1, and down again.

The unit of Figs. 1–8 has thus far been described as being operated to produce strips of treated tissue, 4¾ in. wide, which are adapted for subsequent operations by other units of the machine. However, the unit of Figs. 1–8 can be used to produce tissue in other sizes.

If it is desired to produce rolls of the treated tissue for use in suitable dispensers in industrial plants, the tissue is led from the idler roll 44 (Fig. 1) to the roller 75. This is a back-up roll having grooves 76 spaced 2¾ in. apart. A plurality of slitter arms 77, carrying slitter wheels 78 are pivoted on shaft 79 and held in spaced relation by collars 80. The slitter arms 77 are moved from raised inactive position, as illustrated in Fig. 3, to their operating position in which each slitter wheel 78 registers with one of the grooves 76. Slitter wheels 78 are driven by contact thereof with the sides of grooves 76, as described in connection with slitters 48.

In order to wind up these rolls of industrial tissue the wind-up mandrel 55 is removed from the machine, and a smaller wind-up mandrel on which a plurality of cardboard cores are mounted, is placed in the notches 81 and engaged with suitable drive gears. The ribbons of industrial tissue go directly from slitters 78 to the wind-up spools.

The driving mechanism for unit No. 1 is clearly indicated in Fig. 2. The motor 81 controlled by foot switch 81a drives two variable speed drives 82 and 83. The main drive sprocket 85 is operated by transmission 82. The main sprocket chain 84, after going around the drive sprocket gear 85 drives the following sprockets: sprocket 42, which drives the lower draw roll; sprocket 86, mounted on the back-up roller 51 for the slitter and perforator; sprocket 87, mounted on the idler roll 43; sprocket 88, mounted on the back-up roller 75 for the narrow slitter; sprocket 89, which drives gear 57 on the wind-up mandrel; and then back to drive sprocket 85.

To adjust the speed of the main drive a hand wheel 90 turns a speed control indicator 91, and is connected by sprocket chain 92 to a sprocket 93 on a stub shaft, which extends inwardly part way across the frame. Another sprocket chain 94 connects the stub shaft to sprocket 95, which turns the speed changing shaft of variable speed drive 82.

The treating rolls C are driven from sprocket 96 of variable speed drive 83. A sprocket chain 97 passes around the drive sprocket 96, over an idler sprocket 98 to the sprocket 99, which is geared to the dip roll 18 (see Fig. 4).

As for the relative speeds of the different elements, the draw rolls D, the slitting and perforating rolls E, and the wind-up mandrel F all operate at the same peripheral speed. The speed of the treating rolls C is separately adjustable, because this speed must vary according to weight and character of the material being treated.

All of the rolls used in this machine extend the full width of the tissue, and are approximately 42 in. wide.

A convenient means for applying and adjusting the tension on the draw rolls is provided by a handwheel 100 mounted on subframe 47. A sprocket 101 driven by handwheel 100, is connected by sprocket chain 102 to sprocket 40 (Fig. 6) which rotates the adjusting gears.

*Operation of unit 1 (tissue treating)*

Before starting the unit, the roll of tissue paper is threaded through the machine as indicated in Fig. 1 and its end is wrapped around the wind-up mandrel sufficiently to provide firm engagement.

The speed control dial 91 being now set at a slow speed (10 to 15 feet per min.), the operator starts the machine by pressing foot pedal 81a, which starts motor 81 and sets the moving parts into motion.

At starting the draw rolls D are not pressing on the paper. After the machine has started at slow speed the operator turns handwheel 100 to lower the upper draw roll causing the draw rolls to start drawing the tissue.

As soon as the operator sees that everything is operating properly at slow speed, he turns handwheel 90 to increase the paper travel to 125 to 150 feet per min.

As the wind-up mandrel rotates count is taken of the number of revolutions and after 32 layers have been wound up, the operator stops the machine by again actuating the foot switch 81a.

He now presses foot pedal 73 to cause air cylinder 72 to move table 70 up to the dot-dash line position into contact with the roll of tissue on the wind-up mandrel 55. The wind-up mandrel 55 is now rotated by hand (such movement being permitted by the friction clutch 68) until the locating socket is aligned with the locating bracket 69, then locating pin 67 is inserted to hold the wind-up mandrel in this position. The operator now pushes the rotating slitter 63 across the mandrel to sever the sheets and permit them to fall in the form of pads of tissue strips upon the work table 70.

Each of these pads consists of 32 strips of tissue, 4¾ in. wide and approximately 22½ in. long, with a line of perforations ⅜ in. from one of the long sides. These pads are now removed from the unit, the ends are trimmed to exactly 22½ in., and they are now ready for the next step in the process.

In removing the pads from the unit the operator presses foot pedal 74 to lower the work table. He now turns down the speed indicator 91 to slow speed, and the unit is ready to repeat the cycle.

*Unit No. 2 (cut-off and preliminary forming of cover)*

Figures 9, 10:
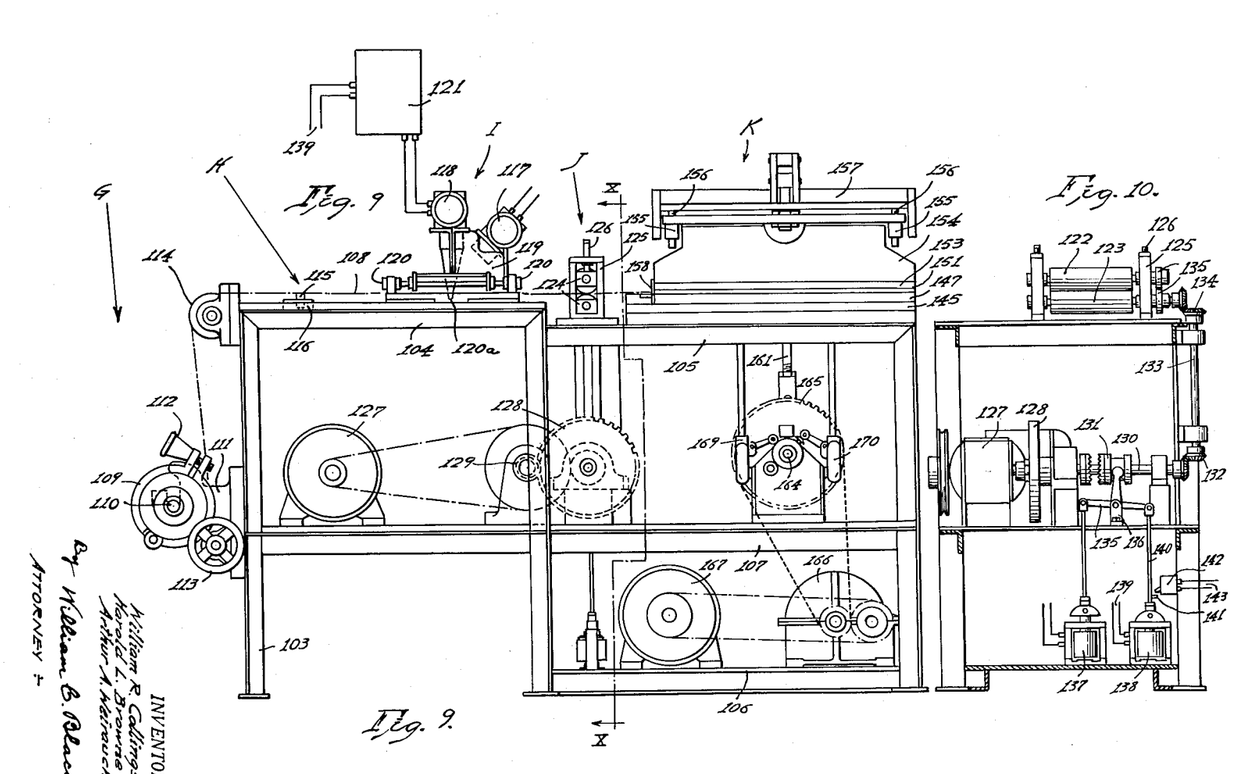
Fig. 9 is a side elevation of the unit for cutting-off and preliminarily forming the cover stock.
Fig. 10 is a section on line X—X of Fig. 9.

The general operation of this unit is best understood by referring to Fig. 9. The stock that is to form the cover of the finished book of tissues is delivered to the plant in rolls of the required width. One of these supply rolls is indicated generally by the letter G. The stock, after leaving the supply roll G, passes station H, where a fluid is applied to its lower surface; station I, an electronic counter which measures an accurate length of the stock; station J, where draw rolls move it along; and station K, where a reciprocating die head cuts off a pre-measured length of the stock and subjects it to a preliminary forming operation.

Referring to Figs. 9–13 in greater detail, the unit includes a frame 103 which provides an upper table 104, a table 105 slightly stepped-down from table 104, a lower table 106, and an intermediate table 107.

The cover stock 108, which is a suitable plastic, such as cellulose acetate, is delivered to the plant in rolls 6 in. wide. One of these rolls 109 is placed on the shaft 110 supported on brackets 111 at the left end of the frame (Fig. 9). A friction brake 112 applies a slight friction on the shaft 110 to prevent over-running of the supply roll. A handwheel 113 is suitably geared to shift the supply roll along its axis to permit aligning it with the other operating parts of the machine.

The cover stock is drawn from the roll 109, around idler 114 and across table 104 with the side which will be the outside of the cover, down.

At station H the lower surface of the stock rubs over a wick 115 which extends into a pan 116 containing an aqueous emulsion of a diogranopolysiloxane fluid in which the organic radicals are monovalent hydrocarbon radicals. The application of this emulsion to the cover stock serves two purposes: (1) it prevents electrostatic effects, which would otherwise render the stock difficult to handle during subsequent operations; (2) it dries to give a high and uniform luster to the surface which will form the outside of the book.

At the next station I an electronic counter measures an accurate length of the stock. This mechanism includes an electric lamp in a housing 117, and a photoelectric cell in a housing 118. The lamp and the cell are arranged to focus on the same spot on the cover stock and are carried on a frame 119 which can be adjusted longitudinally by screws 120, and laterally by stud 120a to secure an accurate cut-off at the desired length.

The cover stock is of a dark color with certain art decorations, not shown, which include a clear spot which appears in the same position on each of the final covers. In this unit it is desired to cut off a piece of the cover stock long enough for 10 books each 2¼ in. wide. In other words, the strip of cover stock must be exactly 22½ in. long. This length is accurately measured by focusing the photoelectric cell on the clear spot, and connecting the cell to an electronic counting device housed in control box 121. The counting device is set so that after nine of the clear spots have passed the electronic cell, the appearance of the tenth spot will immediately energize the electronic cell and close a switch in the control box which stops the draw rolls at station I and causes operation of the cut-off and forming device at station K as will be explained presently.

At station J the two rubber-covered draw rolls 122 and 123 are supported in bearings 124 mounted on supports 125 on table 105. Adjusting screws 126 provide means for adjusting the pressure of the draw rolls on the cover stock.

The operating means for the draw rolls 122 and 123 is shown on Figs. 9 and 10. The motor 127 drives gear 128 continuously through a spur gear 129. The shaft 130 is mounted to be driven from gear 128 by clutch 131. The outer end of shaft 130 is connected by miter gears 132 with vertical shaft 133 which drives the lower draw roll 123 through miter gears 134. Spur gears 135 drive the upper draw roll 122 from the driven shaft of the lower draw roll 123.

The means for operating the clutch 131 includes the T-shaped lever arm 135 which is pivoted on a support 136 and is tilted from "on" to "off" positions by solenoids 137 and 138.

When, during the operation of this unit, the counting mechanism in control box 121 operates the stop switch, an electric current is transmitted through wires 139 to solenoid 138, which pulls down the right side of lever 135, disengaging the clutch 131 and stopping the draw rolls 122 and 123.

As the solenoid 138 pulls down on trip rod 140, a detent 141 trips a micro-switch 142 which is connected by circuit 143 to solenoid 144 (Fig. 11) which permits operation of the cut-off and forming head.

Figure 11:
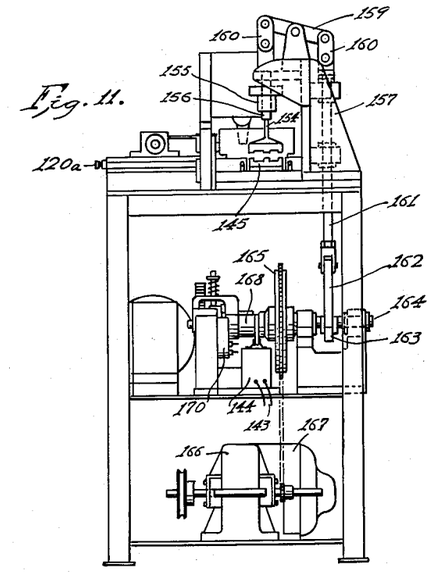
Fig. 11 is an end elevation of the machine of Fig. 9 looking at it from the right side of Fig. 9.
Figure 12:
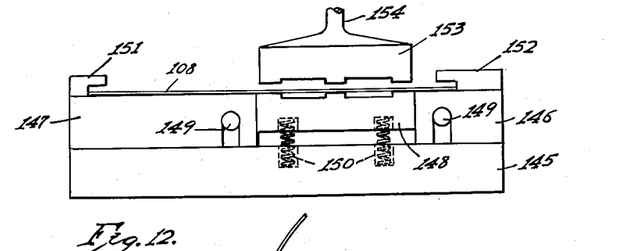
Fig. 12 is an enlarged end elevation of some of the parts of Fig. 11.
Figure 13:
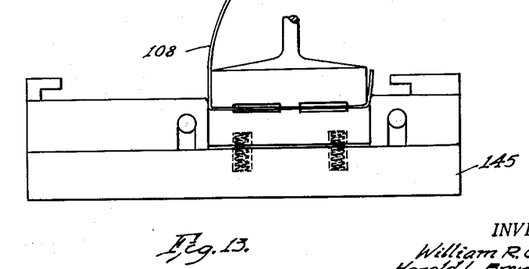
Fig. 13 is a view similar to Fig. 12 but showing the parts in another position.

The cut-off and forming mechanism at station K includes a forming die seen in Fig. 11 and in greater detail in Figs. 12 and 13.

The forming die includes a base plate 145, side plates 146 and 147, and a middle plate 148. The side plates 146 and 147 are provided with electric heating elements 149 which keep these plates heated while the machine is in operation. Springs 150 support the middle plate 148 and normally hold it in its upper position with its upper surface flush with the upper surfaces of plates 146 and 147, but permit it to be depressed to its lower position shown in Fig. 13.

The cover stock, which is shown at 108 in Figs. 12 and 13, passes longitudinally over plates 146, 147 and 148, and is held in accurate lateral alignment by guide plates 151 and 152. In the preliminary forming operation a reciprocating punch plate 153 is moved down to depress the middle plate 148 and bend the cover stock to the position illustrated in Fig. 13.

It will be clear from Fig. 9 that all of the parts which constitute the forming die extend the full length of the 22½ in. piece of cover stock which is to be formed and cut off. These die-forming parts are: 146, 147, 148, 151, 152 and 153.

The reciprocating punch plate 153 is carried on a punch holder 154 which is guided by bushings 155 riding on guide posts 156 mounted on the support 157. A cut-off blade 158 is mounted on the left-hand end (Fig. 9) of the punch holder 154.

The punch holder 154 is reciprocated vertically (Fig. 11) by an oscillating lever 159 which is pivoted on the support 157 and is connected by pivoted links 160 to the punch holder 154 and to the reciprocating rod 161. The rod 161 is reciprocated by a connecting rod 162 driven from crank arm 163 on shaft 164.

The means for driving shaft 164 includes a wheel 165 which is free to rotate on shaft 164, and is continuously driven by a speed reducer 166 actuated by motor 167. The wheel 165 is connected and disconnected from shaft 164 by a one-revolution clutch 168 operated by the solenoid 144. As previously described, this solenoid is energized by micro-switch 142 when the draw rolls are stopped.

Energization of solenoid 144 withdraws a pin and permits clutch 168 to connect shaft 164 to wheel 165 for one revolution. During this revolution the crank arm 163 causes the punch holder 154 to move down and back again.

As soon as shaft 164 starts to rotate it operates cam switch 169, which de-energizes solenoid 144, to permit the clutch 168 to disengage shaft 164 as soon as the single revolution is completed.

When shaft 164 completes its revolution it operates cam switch 170, which performs the following operations:

(*a*) Energizes solenoid 137, which causes clutch 131 to re-engage, thus re-starting the draw rolls 122 and 123.

(*b*) Resets the control relay in control box 121, and the counting device now starts to count over again as the strip stock starts to move again past the photoelectric cell.

In the drawings complete electric circuits connecting the various electrical units are not shown. It is believed that those skilled in the art will understand how these connections are to be made.

*Operation of unit 2*
(*cut-off and preliminary forming of cover*)

In starting this unit the operator threads the cover stock through the mechanism until its end is flush with the right-hand end of the forming die (Fig. 9). He then starts the unit, and the following operations take place.

At station H the emulsion is applied to the surface which is to become the outside of the book.

At station I the electronic counting mechanism counts the member of cover units, and accurately determines the exact length (22½ in.) of the cover unit, by operating solenoid 138 which stops the draw rolls at station J.

Operation of solenoid 138 trips the switch 142 which causes actuation of the reciprocating punch holder 154. The cut-off blade 158 carried by the punch holder 154 cuts off the measured length of cover stock.

The cover stock has been slightly heated along the inner edges of the plates 146 and 147 as it is pushed along the die. As the punch holder 154 descends it bends the cover stock to the position illustrated in Fig. 13, giving the stock a permanent set along lines which correspond to the inner surfaces of plates 146 and 147. As the formed piece of cover stock is pushed from the die by the advancing cover stock on the next sequence, it assumes the partially folded condition illustrated in Fig. 16 and is now in suitable form for use as a cover for a multiple-book sub-assembly.

As clearly shown in Figs. 12 and 13, the moving die plates are off-set from the center line of the strip of cover stock, so that the partially formed cover has one long flap and one short flap.

After the cover stock passes station H where a film of emulsion was applied, the water starts to evaporate from the film of emulsion, and any water remaining is evaporated by the heat of the die at station K. The partially-formed piece of cover stock therefore leaves this unit in a dry condition with a film of the applied chemical.

*Unit No. 3* (*stapling and cut-off of finished books*)

Figure 14:
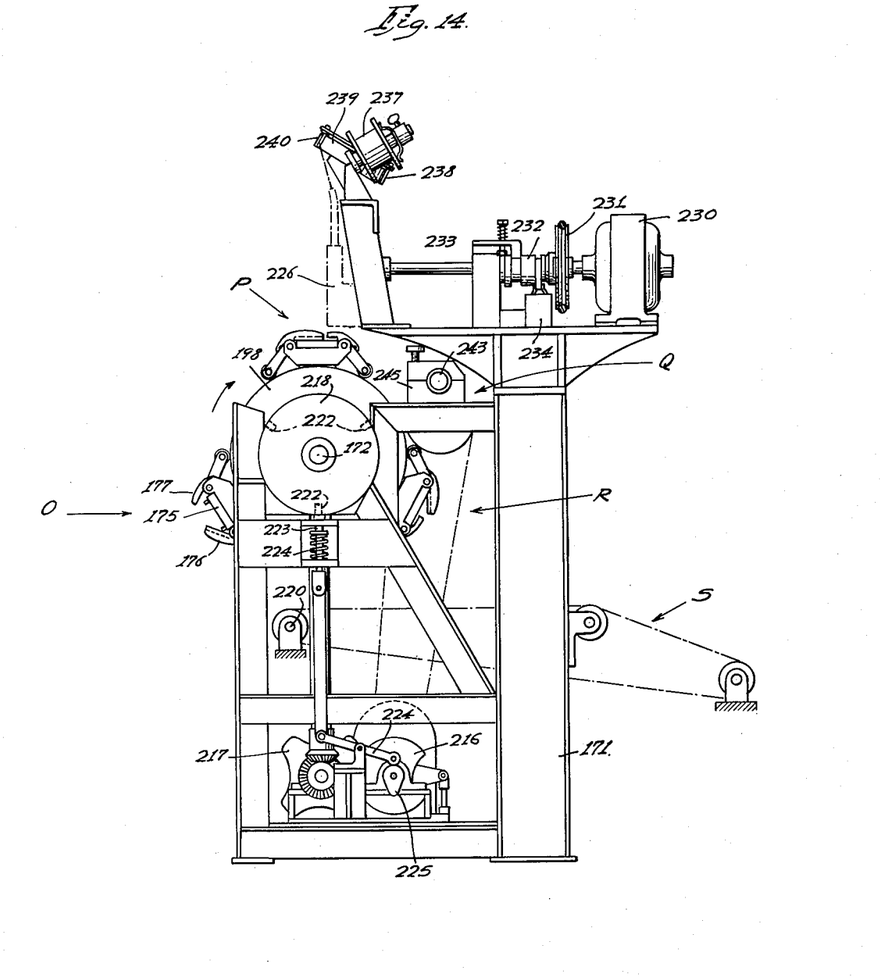
Fig. 14 is a side elevation, partly schematic, of the unit for stapling and cutting off the finished books.
Figure 16:
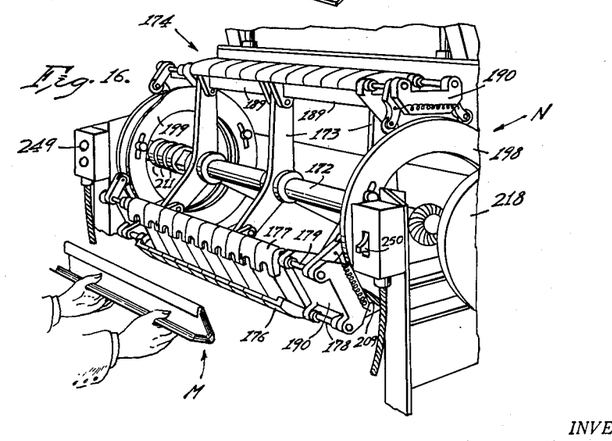
Fig. 16 is an enlarged perspective view of parts of the unit of Fig. 14.

The general operation of this machine is best understood by referring to Figs. 14 and 16. In Fig. 16 the letter M indicates generally the sub-assembly (formed by combining the treated tissues from unit No. 1 with the piece of cover stock of unit No. 2) ready to be fed into the unit. Letter N designates the rotatable frame which carries the sub-assembly from the loading station at O, to the stapling station at P, through the slitting position at Q to the station at R at which unloading starts. While passing from station R to station O, the finished books fall onto the delivery conveyor S.

Referring to Figs. 14 to 22 in greater detail, it will be seen that this unit includes a frame 171 on the upper front portion of which is mounted a shaft 172 which carries the rotatable frame N.

Figure 17:
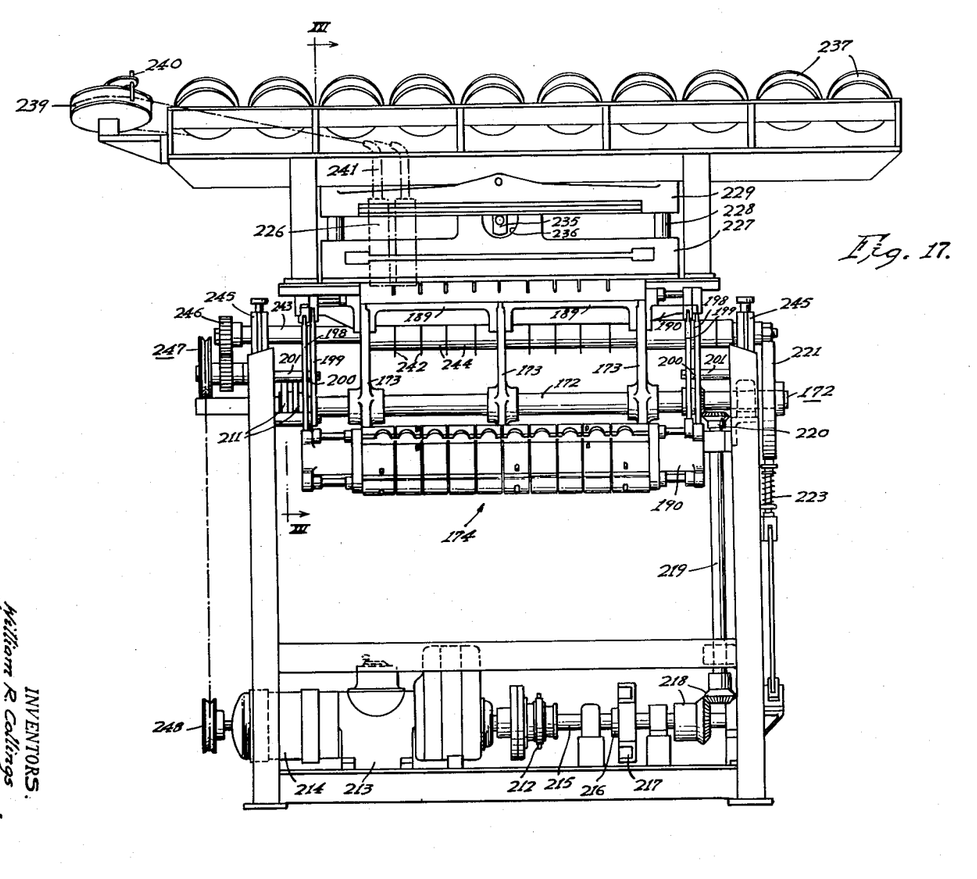
Fig. 17 is a front elevation of the unit of Fig. 14.

The frame N, as shown in Figs. 16 and 17, includes three spiders, each having three arms 173. The outer ends of these arms carry three heated holding-and-forming dies 174, which consist essentially (Fig. 14) of an anvil plate 175, a long hinged cover 176 and a short hinged cover 177.

Figures 18, 19:
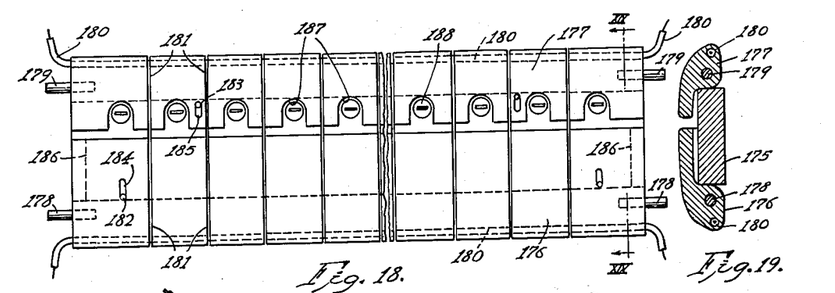
Fig. 18 is an enlarged plan view of one of the dies.
Fig. 19 is a section on line XIX—XIX of Fig. 18.
Figures 20, 21, 22, 23:
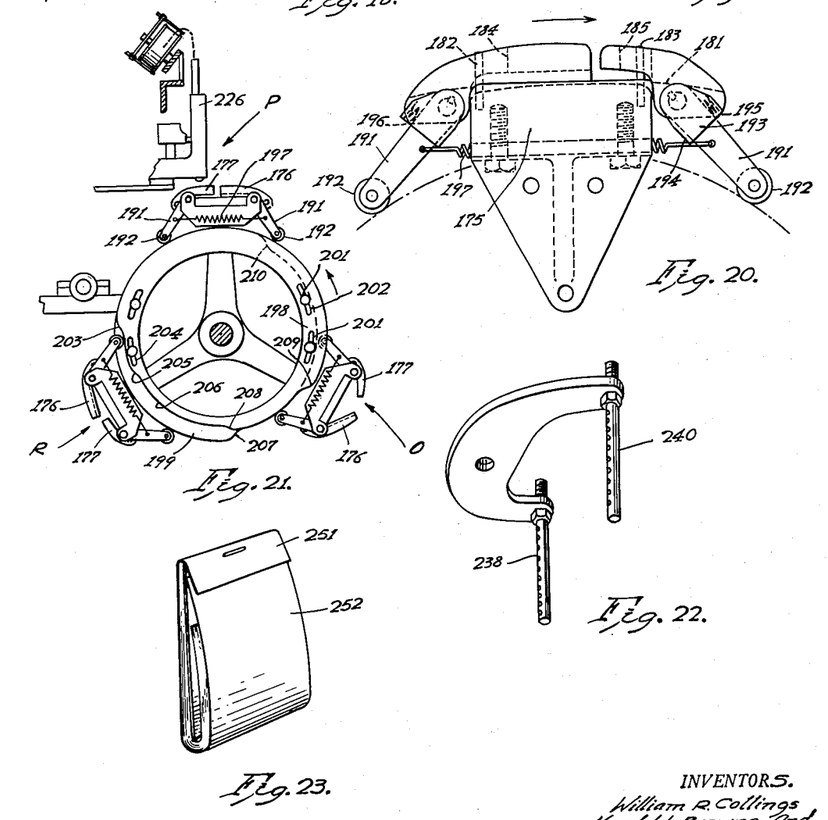
Fig. 20 is an enlarged schematic detail in elevation of the die and its operating means.
Fig. 21 is a section, partly schematic, on line XXI—XXI of Fig. 17.
Fig. 22 is an enlarged perspective of the wire guide.
Fig. 23 is a perspecitve of a finished book.

The dies 174 are illustrated in greater detail in Figs. 18, 19 and 20. The anvil plate 175 is a rectangular steel plate 24 in. long. As shown in the cross-section, Fig. 19, the long hinged cover 176 has a thin portion extending over the anvil plate 175, and a thickened base portion by which it is hinged. The short hinged cover 177 has a similar thickened base portion, but its thin portion extending over the anvil plate is shorter. The two covers 176 and 177 are preferably aluminum castings.

A hinge pin 178 is anchored in each end of the base portion of cover 176, and similar pins 179 are anchored in each end of the base portion of cover 177. These hinge pins form means for opening and closing the covers to clamp the sub-assembly M as will presently be explained. A bore extends the full length of each of the hinged covers outside of the shafts, and an electric heating element 180 is placed in each of these bores.

A plurality of slots 181 extend transversely of the anvil plate 175, and the hinged covers 176 and 177. These slots are to permit the rotary slitting discs at Q to cut entirely through the sub-assembly M which is clamped in the die. The slots therefore extend from the top surface of the die to the dotted lines shown in Fig. 20.

The center lines of the slots 181 are so disposed as to produce finished books 2¼ in. wide.

The sub-assembly M must be accurately positioned in the die 174 before the hinged covers close. To position the subassembly vertically the pins 182 and 183 are anchored in the anvil plate 175. Pins 182 project through elongated slots 184 in the long hinged cover 176, and pins 183 project through elongated slots 185 in the short hinged cover 177. To position the sub-assembly horizontally the long hinged cover 176 is formed with thickened ends which form internal shoulders 186, which contact the ends of the sub-assembly.

To allow stapler heads to contact the upper surface of the sub-assembly, a notch 187 is cut into each book-wide section of the short hinged cover 177. To turn over and clinch the staples a hardened anvil 188 is set into the anvil plate 175 below each of the notches 187.

The dies 174 are mounted on support brackets 189 (Figs. 16 and 17) which are bolted to the outer ends of spider arms 173. The means for operating the hinged covers are carried by outboard brackets 190, which are bolted to the outer surfaces of the end spiders.

The hinged covers 176 and 177 are operated by means of follower arms 191 (Figs. 20 and 21) which carry on their outer ends cam rollers 192 which engage cam rings. The follower arms 191 pivot freely on the hinge pins 178 and 179. To transmit movement from the arms 191 to the covers, a yoke 193 is keyed to each of the hinge pins and has an extension 194 which projects under the arm 191 and an extension 195 which projects over the arm. A spring 196, located between the extension 195 and the arm, causes the arm to hold the cover closed under resilient pressure. A tension spring 197 is used to bias two related follower arms 191 toward each other and thus cause the rollers 192 to remain in contact with their cam rings.

The outboard brackets 190 carry the hinge pins 178 and 179 and project out over the cam rings so that the follower arms 191 may engage the cam rings.

The follower arms 191 at each end of the long hinged cover 176 are operated by the cam rings 198, while the arms 191 at each end of the short hinged cover 177 are operated by the cam rings, 199. The pair of cam rings at each end of the rotating frame N are held apart by spacers 200 (Fig. 17) and are bolted to the frame by stud bolts 201 with the rings 199 in the inside position. Elongated slots 202 (Fig. 21) permit adjustment of the cam rings circumferentially to secure correct sequencing of the operations. Each of the cam rings has a raised track on the normal periphery of the ring, which corresponds to the closed position of the associated hinged cover, and a depressed track, which corresponds to an open position of the associated hinged cover, with cam ramps connecting the raised and depressed tracks.

When the die 174 is at the stapling station P all of the follower arms 191 are riding on the raised tracks, and both of the hinged covers are held closed. As the frame N is rotated carrying the die from the stitching station P to station R, the follower arms for the long hinged cover 176 ride down the cam ramps 203 to the depressed tracks 204, thus partially opening the long hinged cover.

As the die 174 moves from station R to the loading station O, the follower arms for the long hinged cover 176 ride down the cam ramps 205 to the lower depressed tracks 206, permitting the hinged cover 176 to swing wide open, going past dead center. Just after this has happened the follower arms for the short hinged cover 177 ride down cam ramps 207, opening this cover and permitting the finished books to fall to the delivery conveyor. By causing the covers to open in this sequence the books are dropped on the conveyor in an orderly arrangement. As the die 174 moves farther along, the follower arms for the long hinged cover 176 ride up the cam ramps 208, which kick these arms back to the right side of dead center. The die 174 is now at loading station O and the hinged covers are in partially opened position ready to receive a sub-assembly M.

As the die moves from the loading station O, the follower arms for the long hinged cover 176 ride up cam ramps 209 to the raised tracks, thus closing this cover, and keeping it closed until its follower arms again ride down the ramps 203. Shortly thereafter the follower arms for the short hinged cover 177 ride up the cam ramps 210, thus closing this cover, and keeping it closed until its follower arms again ride down the cam ramps 207.

The heating elements 180 (Fig. 18) are omitted from some of the view to simplify the drawings. These elements are supplied current from brushes contacting the collector rings 211. The brushes and wiring are well understood in the art and are therefore not illustrated. The heating elements keep the holding-and-forming dies 174 heated all the time the machine is in operation.

The means for rotating the frame N (Figs. 14 and 17) includes a clutch 212 driven through a variable speed transmission 213 by a motor 214. A main drive shaft 215 connects the clutch to the driving member 216 of a Geneva movement. The driven member 217 of the Geneva movement drives, through bevel gears 218, a vertical shaft 219, which is connected by bevel gears 220 with the shaft 172 which carries the frame N. As is well understood, the Geneva movement provides an intermittent drive, and the gearing is so proportioned that this step-by-step drive carries the frame N through an arc of 120° at a time, thus moving the holding-and-forming dies 174 from station to station, as previously explained. The mechanism can be adjusted to provide a dwell of from 6 to 12 seconds at each station.

In order to positively hold the frame N during the dwell at each station, an indexing plate 221 is keyed to the right-hand end of shaft 172. This indexing plate is formed with three radial sockets 222 spaced 120° apart and corresponding to the three stationary positions of the frame N. An index pin 223 is biased upwardly by a spring 224 so that as soon as the indexing plate 221 rotates to a position where one of the sockets 222 is properly aligned, the index pin is pushed upwardly into the socket. When it is time to again move the frame N the index pin is pulled down out of the socket by lever arm 224 and cam 225 on the shaft of the driving member of the Geneva movement.

When the holding-and-forming die 174 stops at the stitching station P, the stapler mechanism is operated to insert a staple in each of the sections of the sub-assembly M. The mechanism for inserting these staples will now be explained.

The individual staplers 226, being of conventional construction, will not be described in detail. A stapler is provided for each of the ten book-wide sections, and each one is aligned vertically above one of the notches 187 in the short hinged cover 177. The staplers are mounted on the reciprocable stapler head 227 which is guided on posts 228. The staplers are actuated by actuating bar 229.

The mechanism for reciprocating the stapler head 227, as shown in Fig. 14, includes the motor 230 which continuously runs a pulley 231. A clutch 232 intermittently connects the pulley 231 to the shaft 233. The clutch 232 is actuated by solenoid 234, which is energized by a switch (not shown) which is tripped by the Geneva movement each time the rotating frame N stops. The energization of solenoid 234 permits shaft 233 to rotate one revolution. During this revolution the cam driving link 235, operating in the circular opening 236, causes the stapler head 227 to move down and back again, inserting a staple in each of the books.

Wire spools 237, one individual to each stapler, are mounted on the frame. The wire from each spool passes through an individual hole in a wire guide pin 238 (Figs. 14 and 22), then around the grooved guide wheel 239, through an individual hole in a wire guide pin 240, and to a wire guide 241 attached to the stapler.

As the rotating frame N carries the sub-assembly from the stapling station P to station R, the sub-assembly is cut by slitting discs into ten individual books.

The slitting discs 242 are mounted on the slitter shaft 243 and are spaced apart by the fillers 244 so that one of the slitting discs is aligned with one of the slots 181 formed part-way through the holding-and-forming die 174. The slitter shaft 243 is mounted on the frame in bearing blocks 245, and is spaced from the shaft 172 of rotating frame N such a distance that the slitting discs extend into the slots 181 and completely sever the sub-assembly M into individual books. The slitter shaft 243 is continuously driven through gears 246 and pulleys 247 and 248 from motor 214.

A suitable conveyor, indicated schematically at S in Fig. 14, receives the books as they fall from the opened die 174, and carries them to any suitable packing station.

*Operation of unit No. 3*
*(stapling and cut-off of finished books)*

As previously explained, unit No. 1 produces a pad of treated tissues which is 4¾ in. wide and 22½ in. long. Unit No. 2 produces a semi-formed cover which is 22½ in. long and wide enough to receive a pad of the treated tissues folded lengthwise.

An operator takes one of the pads of treated tissues, folds it lengthwise, and inserts a cardboard stiffener and, if desired, a strip carrying advertising matter. This folded pad is then assembled inside one of the semi-formed covers to produce a sub-assembly as shown at M in Fig. 16. A plurality of these sub-assemblies is prepared and ready for insertion in unit No. 3.

In loading unit No. 3 the operator holds a sub-assembly M in the position shown in Fig. 16 and places it in the die 174 that is in open position at loading station O. The lower bend of the sub-assembly then rests against the locating pins 182 of the long hinged cover 176, and the ends of the sub-assembly are in contact with the internal shoulders 186 of this cover 176.

The operator now starts the slitting discs by pushing button 249, and pushes switch 250 to start the main mechanism.

As soon as the pre-set dwell period is over, the rotating frame N moves the loaded die 174 from the loading station O to the stapling station P. During this movement of the die the following operations take place (omitting intermediate operating details):

1. The long hinged cover clamps down on the sub-assembly.
2. The short hinged cover clamps down on the sub-assembly.

These operations firmly clamp the sub-assembly under resilient pressure in the heated holding-and-forming die 174. The next time the rotating frame N stops the die is at the stapling station P, where the following operation is performed:

3. The stapling head reciprocates to place a staple in each book section of the sub-assembly. (The mechanism may be constructed to insert more than one staple in each book-wide section.)

The rotating frame N next carries the die 174 from stapling station P through slitting station P to station R. During this movement the following operations take place:

4. The slitting discs cut the sub-assembly into ten separate books.
5. The long hinged cover 176 (which is now the upper cover) partially opens, starting the unloading operation.

The rotating frame N now carries the die 174 from station R back to the loading station O. During this movement the following operations take place:

6. The long hinged cover 176 swings open past its dead center.

7. The short hinged cover 177 now opens and the finished books drop to the conveyor S.

It has been found that if both covers are opened simultaneously the books tumble out and assume random positions on the conveyor. By opening the hinged covers in the sequence disclosed herein, all of the books fall flat on the conveyor in the same position.

8. The long hinged cover now swings back past dead center.

Figure 15:
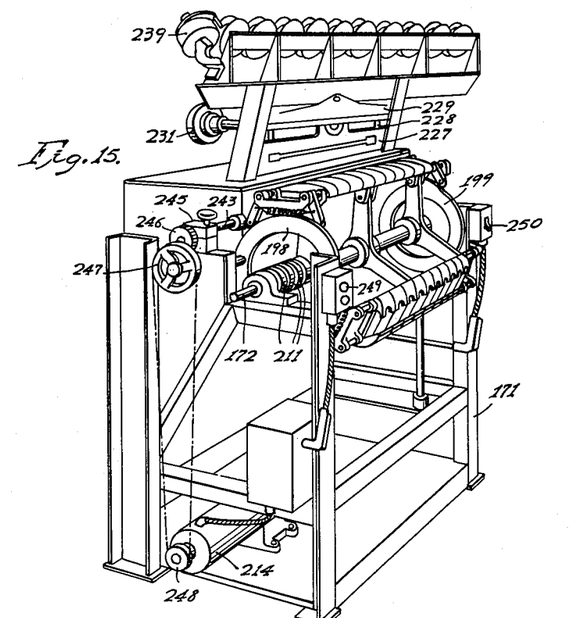
Fig. 15 is a perspective view of the unit of Fig. 14, certain parts being omitted.

The die now has its covers in the partially open position shown at the loading station O in Figs. 14, 15 and 16, and is ready to receive another sub-assembly.

It should be understood that as the frame N rotates the operator places a sub-assembly M in each of the dies 174 in turn as it pauses at the loading station.

The finished book, as shown in Fig. 23, includes the short flap 251, which is stapled down against the inserted material. The long flap 252 is hooked under the short flap, and may be withdrawn to gain access to the tissues.

The above explanation has made it clear that the sub-assembly is held under resilient pressure in a heated die while the stapling and slitting operations are being performed. This arrangement is expeditious and economical because it finishes the forming operation of the book while the stapling and slitting operations are being performed.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A unit for stapling and cutting off books from a sub-assembly which comprises: a holding-and-forming die having two hinged covers for receiving a multiple-book sub-assembly; means for resiliently pressing the covers against the sub-assembly; a plurality of staplers adapted to insert a staple in each book-wide unit of the assembly while the assembly is held in the die; and a plurality of slitting discs arranged to cut the sub-assembly into a plurality of books while the assembly is held in the die.

2. A unit for stapling and cutting off books from a sub-assembly which comprises: a frame which carries a plurality of holding-and-forming dies adapted to receive a multi-book sub-assembly; mechanism for rotating the frame and for stopping it at a loading station, a stapling station and an unloading station; a reciprocably stapler head which carries a stapler individual to each book unit of the sub-assembly; and a slitter shaft which carries a plurality of slitter discs spaced apart the width of a book unit.

3. A unit for stapling and cutting off books from a multiple-book sub-assembly which comprises: a rotatable frame carrying a plurality of holding and forming dies; the unit having a loading station and a stapling station; a slitting position and an unloading position; means to carry each of the dies in said succession to each of the stations and positions and to hold the dies at the stations for a predetermined time and then through each of said positions; stapling mechanism at the stapling station; and means causing the stapling mechanism to operate when a die arrives at the stapling station, a multiple slitter at said slitting position to cut off said books, and cam means for closing said dies at a point between said loading station and said stapling station and for opening said dies at said unloading position.

4. A unit for stapling and cutting off books from a multiple-book sub-assembly which comprises: a rotatable frame which carries a plurality of holding and forming dies, each die being adapted to receive a multi-book sub-assembly; each of the holding-and-forming dies being provided with a pair of hinged covers; mechanism for rotating the frame and for stopping it at a loading station and then at a stapling station, multiple stapling means for inserting staples in the sub-assembly at the stapling station, a plurality of rotary slitters mounted for rotation on an axis parallel to said dies, said mechanism moving said dies from the stapling station past said slitters, said slitters being positioned to cut through said sub-assembly between the staples whereby to form a plurality of individual booklets; cam means for opening and closing the hinged covers of the holding and forming dies, the cam means being arranged to close the hinged covers while the die is being carried from the loading station to the stapling station, and to open the hinged covers after the die has passed the slitters.

5. A unit for stapling and cutting off books from a multiple-book sub-assembly which comprises: a stationary frame; a rotatable frame; a plurality of holding and forming dies mounted on the rotatable frame, each of the dies having a long hinged cover and a short hinged cover; a cam ring for the long hinged cover; a cam ring for the short hinged cover; said cam rings being immovably mounted on the stationary frame; each of said hinged covers carrying at its end a follower arm which engages one of the cam rings for opening and closing the hinged cover.

References Cited in the file of this patent
UNITED STATES PATENTS

| Number | Name | Date |
|---|---|---|
| 773,484 | Drucklieb | Oct. 25, 1904 |
| 1,404,589 | Dixon | Jan. 24, 1922 |
| 1,409,908 | Afelder | Mar. 21, 1922 |
| 1,730,196 | De Pamphilis | Oct. 1, 1929 |
| 1,777,448 | Rader | Oct. 7, 1930 |
| 2,211,359 | Wright | Aug. 13, 1940 |
| 2,263,007 | McNally | Nov. 18, 1941 |
| 2,294,796 | Moulder | Sept. 1, 1942 |
| 2,331,664 | Dickey | Nov. 12, 1943 |
| 2,339,286 | Moule | Jan. 18, 1944 |
| 2,342,236 | Allen | Feb. 22, 1944 |
| 2,391,708 | Johnson et al. | Dec. 25, 1945 |
| 2,463,769 | Higgins | Mar. 8, 1949 |
| 2,474,391 | Bergstein | June 28, 1949 |
| 2,487,494 | Taber | Nov. 8, 1949 |
| 2,541,913 | Carter | Feb. 13, 1951 |
| 2,555,369 | Pollitt | June 15, 1951 |
| 2,567,201 | Goepfert | Sept. 11, 1951 |